(12) United States Patent
Yamada

(10) Patent No.: US 10,488,946 B2
(45) Date of Patent: Nov. 26, 2019

(54) CHARACTER INPUT DEVICE, CHARACTER INPUT METHOD, AND CHARACTER INPUT PROGRAM

(71) Applicant: OMRON Corporation, Kyoto-shi, Kyoto (JP)

(72) Inventor: Takahiro Yamada, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 101 days.

(21) Appl. No.: 15/375,743

(22) Filed: Dec. 12, 2016

(65) Prior Publication Data

US 2017/0262069 A1    Sep. 14, 2017

(30) Foreign Application Priority Data

Mar. 14, 2016    (JP) ................................. 2016-049312

(51) Int. Cl.
*G06F 3/02* (2006.01)
*G06F 3/023* (2006.01)
(Continued)

(52) U.S. Cl.
CPC .......... *G06F 3/0237* (2013.01); *G06F 3/0236* (2013.01); *G06F 3/04812* (2013.01); *G06F 3/04886* (2013.01); *G06F 3/04892* (2013.01)

(58) Field of Classification Search
CPC . G06F 3/0237; G06F 3/04812; G06F 3/04886
See application file for complete search history.

(56) References Cited

U.S. PATENT DOCUMENTS 8,904,309 B1 * 12/2014 Zhai ...................... G06F 3/0482
   715/773
8,959,430 B1 *  2/2015 Spivak .................... G06F 3/048
   715/243

(Continued)

FOREIGN PATENT DOCUMENTS

JP    2005-182345 A    7/2005
JP    2011-223517 A    11/2011

(Continued)

OTHER PUBLICATIONS

The extended European search report dated Jun. 8, 2017 in the counterpart European patent application.

(Continued)

*Primary Examiner* — David E Choi
(74) *Attorney, Agent, or Firm* — Metrolex IP Law Group, PLLC

(57) ABSTRACT

A character input device using a D-pad for inputting a desired character string includes an operation receiving unit, a keyboard management unit, an input character string management unit, a predicted candidate management unit, and a character candidate detection unit. The input character string management unit manages an input character string. The predicted candidate management unit estimates predicted character string candidates based on the input character string, and manages the predicted character string candidates. The character candidate detection unit compares the input character string with the predicted character string candidates, and detects one or more character candidates that are to be selected next. The operation receiving unit receives an input direction that is input with the D-pad. The keyboard management unit executes refined input, in which a cursor is moved only to a character candidate present in the input (Continued)

direction with respect to the character on which the cursor is placed.

18 Claims, 12 Drawing Sheets

(51) Int. Cl.
*G06F 3/0481* (2013.01)
*G06F 3/0488* (2013.01)
*G06F 3/0489* (2013.01)

(56) References Cited

U.S. PATENT DOCUMENTS

| | | | | |
|---|---|---|---|---|
| 2003/0234766 A1* | 12/2003 | Hildebrand | ............ | G06F 1/1626 345/168 |
| 2007/0205983 A1* | 9/2007 | Naimo | ................. | G06F 3/0234 345/160 |
| 2008/0140307 A1 | 6/2008 | Chen et al. | | |
| 2009/0063962 A1* | 3/2009 | Rubanovich | ........... | G06F 3/0237 715/261 |
| 2009/0192786 A1* | 7/2009 | Assadollahi | .......... | G06F 3/0234 704/9 |
| 2010/0293457 A1 | 11/2010 | Peterson | | |
| 2010/0293497 A1 | 11/2010 | Peterson | | |
| 2011/0316800 A1* | 12/2011 | Chacho | ............... | G06F 3/04886 345/173 |
| 2012/0110493 A1* | 5/2012 | Cabral | ................. | G06F 3/0219 715/773 |
| 2012/0169607 A1* | 7/2012 | Tiitola | ................ | G06F 3/04886 345/173 |
| 2012/0278734 A1* | 11/2012 | Ishizuka | ............... | G06F 1/1624 715/752 |
| 2013/0120267 A1* | 5/2013 | Pasquero | .............. | G06F 17/276 345/168 |
| 2013/0125035 A1* | 5/2013 | Griffin | .................. | G06F 3/0237 715/773 |
| 2013/0187857 A1* | 7/2013 | Griffin | .................. | G06F 3/0237 345/168 |
| 2013/0253906 A1* | 9/2013 | Archer | ................. | G06F 17/276 704/9 |
| 2013/0271385 A1* | 10/2013 | Griffin | .................. | G06F 3/0236 345/173 |
| 2013/0285927 A1* | 10/2013 | Pasquero | .............. | G06F 3/0237 345/173 |
| 2013/0325438 A1* | 12/2013 | Griffin | .................. | G06F 17/273 704/9 |
| 2014/0002363 A1* | 1/2014 | Griffin | .................. | G06F 3/0237 345/168 |
| 2014/0115519 A1* | 4/2014 | Ouyang | ................. | G06F 3/0482 715/773 |
| 2014/0136967 A1* | 5/2014 | White | ..................... | G06F 17/21 715/261 |
| 2014/0164981 A1* | 6/2014 | Colley | .................. | G06F 3/0237 715/780 |
| 2014/0237356 A1* | 8/2014 | Durga | ................... | G06F 17/276 715/256 |
| 2014/0240237 A1* | 8/2014 | Park | ...................... | G06F 3/0237 345/168 |
| 2014/0379325 A1* | 12/2014 | Houache | ............... | G06F 3/0237 704/9 |
| 2015/0029090 A1 | 1/2015 | Kim et al. | | |
| 2015/0089429 A1* | 3/2015 | Ghassabian | ......... | G06F 3/04886 715/773 |
| 2015/0128083 A1* | 5/2015 | Jia | ....................... | G06F 16/3346 715/773 |
| 2015/0135123 A1* | 5/2015 | Carr | .................... | G06F 3/04886 715/773 |
| 2016/0085726 A1* | 3/2016 | Bannister | .......... | G06F 16/24534 382/229 |
| 2016/0103502 A1* | 4/2016 | Yang | ..................... | G06F 3/0489 345/169 |
| 2016/0216837 A1* | 7/2016 | Nolan | ..................... | G06F 3/005 |
| 2017/0068448 A1* | 3/2017 | Ghassabian | ......... | G06F 3/04886 |
| 2017/0262069 A1* | 9/2017 | Yamada | ................ | G06F 3/0237 |
| 2017/0371424 A1* | 12/2017 | Mancini | ................ | G06F 3/0489 |

FOREIGN PATENT DOCUMENTS

| | | |
|---|---|---|
| JP | 2012-027879 A | 2/2012 |
| JP | 2012-527045 A | 11/2012 |

OTHER PUBLICATIONS

Japanese Office Action dated Sep. 10, 2019 in a counterpart Japanese patent application.

* cited by examiner

CHARACTER INPUT DEVICE, CHARACTER INPUT METHOD, AND CHARACTER INPUT PROGRAM

CROSS-REFERENCES TO RELATED APPLICATIONS

This application claims priority to Japanese Patent Application No. 2016-049312 filed Mar. 14, 2016, the entire contents of which are incorporated herein by reference.

FIELD

The present invention relates to a technique for inputting characters using a directional pad (D-pad).

BACKGROUND

Conventionally, there are techniques for inputting characters without using a QWERTY layout keyboard. For example, JP2011-223517A discloses a technique for inputting characters by using a D-pad and a numerical keypad in a manner similar to an operation using a QWERTY layout keyboard.

In addition to the technique disclosed in JP2011-223517A, there is also a technique in which a D-pad is used to select and input characters in the QWERTY layout. Specifically, a plurality of characters in the QWERTY layout are displayed on a display screen. While viewing the display screen, an operator uses the D-pad to place a cursor on a desired character of the plurality of characters. When the operator presses an enter button in a state in which the cursor is placed on the desired character, the input of this character is received.

JP2011-223517A is an example of background art.

However, in the technique disclosed in JP2011-223517A, it is not possible to input characters using only the D-pad.

Furthermore, the above-described conventional technique of inputting characters using only the D-pad may require an operation for moving the cursor so that the cursor is placed on the desired character. For example, in a case where the character "A" has been input, and then the character "K" is to be input as a desired character, an operator needs to use the D-pad to move the cursor sequentially to the characters "S", "D", "F", "G", "H", and "J". Therefore, in this case, the six input operations only function to move the cursor. Accordingly, the above-described conventional character input using only the D-pad is a wasteful operation.

It is an object of the present invention to improve, in character input using a D-pad, the operability for inputting a desired character string.

SUMMARY

In order to achieve the above-described object, a character input device according to the present invention has the following configuration.

The character input device includes: an input character string management unit; a predicted candidate management unit; a character candidate detection unit; an operation receiving unit; and a keyboard management unit. The input character string management unit is configured to manage an input character string that was input. The predicted candidate management unit is configured to estimate (predict) predicted character string candidates based on the input character string, and manage the predicted character string candidates. The character candidate detection unit is configured to compare the input character string with the predicted character string candidates, and detect one or more character candidates that are to be selected next. The operation receiving unit is configured to receive an input direction that is input with a D-pad. The keyboard management unit is configured to execute refined input, in which a cursor is moved only to a character candidate that is present in the input direction with respect to the character on which the cursor is placed.

According to this configuration, characters to which the cursor is to be moved are narrowed down based on the predicted character string candidates, and thus it is not necessary to use the D-pad to perform input only for moving the cursor. Accordingly, the operability of the character input is improved.

Furthermore, in this character input device, preferably, the operation receiving unit is capable of receiving a cancellation of the refined input. If the cancellation of the refined input is input from the operation receiving unit, the keyboard management unit executes standard input, in which the cursor is moved to a character that is adjacent, in the input direction, to the character on which the cursor is placed.

According to this configuration, even if no desired character string is included in the predicted character string candidates, it is possible to perform character input of inputting the desired character string.

Furthermore, in this character input device, preferably, if the keyboard management unit detects that there is no character candidate in the input direction, the keyboard management unit moves the cursor to a character candidate that is present in a region on the side in the input direction from the character on which the cursor is placed, and is closest to the character on which the cursor is placed.

According to this configuration, even if no character candidate is present in the input direction, it is possible to move the cursor to continue the refined input.

Furthermore, in this character input device, preferably, if there is no predicted character string candidate, the keyboard management unit executes the standard input, in which the cursor is moved to a character that is adjacent, in the input direction, to the character on which the cursor is placed.

According to this configuration, even if there is no predicted character string candidate, it is possible to input the desired character string.

Furthermore, in this character input device, preferably, the keyboard management unit highlights the character candidate.

According to this configuration, an operator can easily view the character candidate.

Furthermore, in this character input device, preferably, if there are a plurality of predicted character string candidates, the predicted character string candidate management unit sets an order of priority for the plurality of predicted character string candidates. In execution of the refined input, if there is only one predicted character string candidate, the keyboard management unit automatically moves the cursor to the character candidate obtained from the predicted character string candidate. If there are a plurality of predicted character string candidates, the keyboard management unit automatically moves the cursor to the character candidate obtained from the predicted character string candidate with the highest priority.

According to this configuration, since the cursor is automatically moved based on the predicted character string candidate, the operability is further improved.

According to the present invention, it is possible to improve, in character input using a D-pad, the operability for inputting a desired character string.

DETAILED DESCRIPTION

Hereinafter, a character input device and a character input method according to an embodiment of the present invention will be described.

Figure 1:
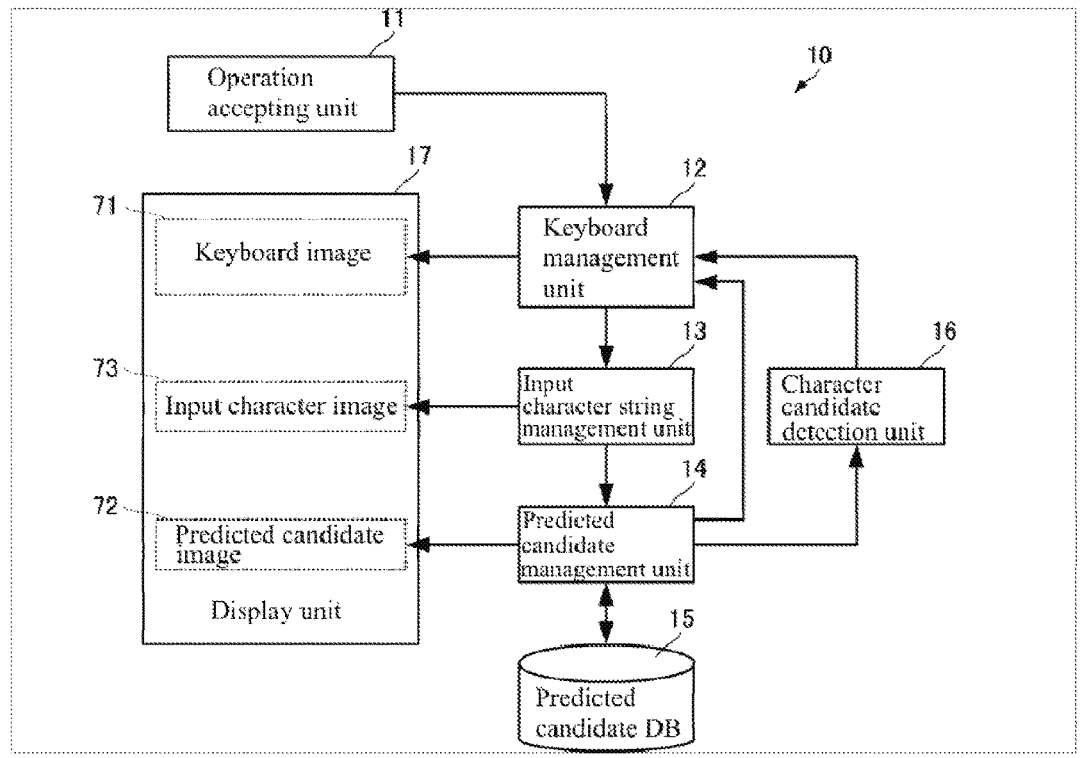
FIG. 1 is a block diagram illustrating a configuration of a main part of a character input device according to an embodiment of the present invention.

FIG. 1 is a block diagram illustrating a configuration of a main part of the character input device according to the embodiment of the present invention. A character input device 10 is provided with: an operation receiving unit 11, a keyboard management unit 12, an input character string management unit 13, a predicted candidate management unit 14, a predicted candidate DB 15, a character candidate detection unit 16, and a display unit 17.

Figure 2:
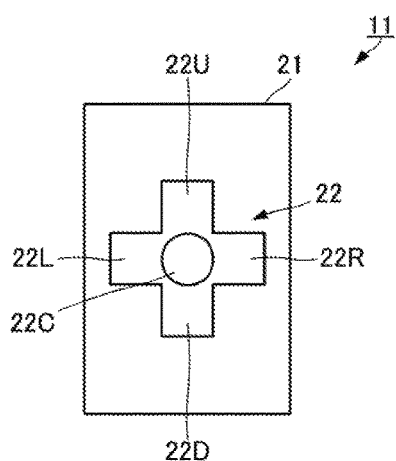
FIG. 2 is a diagram illustrating a main configuration of an operation receiving unit.

FIG. 2 is a diagram illustrating a main configuration of the operation receiving unit. The operation receiving unit 11 is provided with a housing 21 and a directional pad (D-pad) 22. The D-pad 22 is attached to the housing 21. The D-pad 22 is provided with an upward operation button 22U, a downward operation button 22D, a rightward operation button 22R, a leftward operation button 22L, and an enter button 22C. The upward operation button 22U and the downward operation button 22D are opposite to each other with the enter button 22C interposed therebetween. The rightward operation button 22R and the leftward operation button 22L are opposite to each other with the enter button 22C interposed therebetween. A direction in which the upward operation button 22U and the downward operation button 22D are lined up and a direction in which the rightward operation button 22R and the leftward operation button 22L are lined up are orthogonal to each other. In other words, the upward operation button 22U, the downward operation button 22D, the rightward operation button 22R, and the leftward operation button 22L form a cross. The enter button 22C is arranged in the center of this cross.

When the upward operation button 22U is pressed, the operation receiving unit 11 outputs a detection signal of the input direction indicating the upward direction. Similarly, when the downward operation button 22D, the rightward operation button 22R, and the leftward operation button 22L are respectively pressed, the operation receiving unit 11 respectively outputs detection signals of the input directions indicating the downward direction, the rightward direction, and the leftward direction. When the enter button 22C is pressed, the operation receiving unit 11 outputs an "enter" detection signal. The operation receiving unit 11 outputs the detection signals of the input directions and the "enter" detection signal to the keyboard management unit 12.

Figure 3:
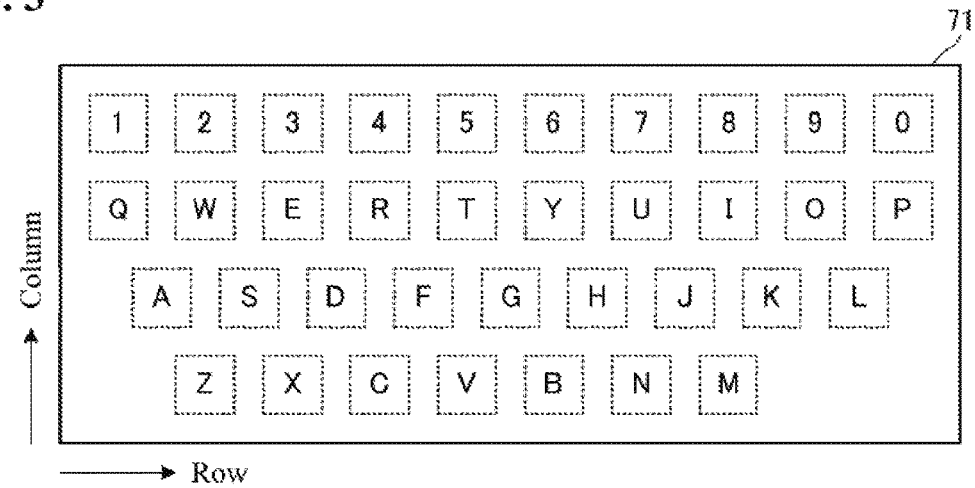
FIG. 3 is a diagram illustrating an example of a keyboard image.

The keyboard management unit 12 displays, on the display unit 17, a keyboard image 71 as shown in FIG. 3. FIG. 3 is a diagram illustrating an example of the keyboard image. As shown in FIG. 3, the keyboard image 71 includes a plurality of characters in the QWERTY layout. In other words, the plurality of characters are arranged in a row direction and a column direction. Upon detecting an input direction based on a detection signal from the operation receiving unit 11, the keyboard management unit 12 moves a cursor in the input direction from the character on which the cursor is placed. The keyboard management unit 12 displays the character on which the cursor is placed in a different display mode from that of other characters. Accordingly, the operator can easily recognize the character on which the cursor is currently placed.

Also, the keyboard management unit 12 moves the cursor in different modes between "refined input (in which the number of input candidates is narrowed down, this may also be referred to as "narrowed-down input")" and "standard input" (may also be referred to as "basic input") that will be described later. Roughly speaking, if a character candidate is input from the character candidate detection unit 16 to the keyboard management unit 12, and the refined input has been set, the keyboard management unit 12 moves the cursor only to the character candidate. On the other hand, if no character candidate is input from the character candidate detection unit 16, or the standard input has been set, the keyboard management unit 12 moves the cursor to a character adjacent to the character on which the cursor is placed.

If the keyboard management unit 12 acquires an "enter" detection signal in a state in which the cursor is placed on any character, the keyboard management unit 12 outputs this character on which the cursor is placed to the input character string management unit 13.

The input character string management unit 13 sequentially stores characters input from the keyboard management unit 12 until the input of a desired character string (character string that the operator wants to input) is entered. The input character string management unit 13 displays, as an input character image 73, the input character string that was input on the display unit 17. Accordingly, the operator can view the current character input situation.

The input character string management unit 13 outputs the input character string to the predicted candidate management unit 14.

The predicted candidate management unit 14 compares the input character string with those stored in the predicted candidate DB 15, and estimates predicted character string candidates that correspond to the input character string. The predicted candidate DB 15 is a predicted candidate dictionary in which character strings that can serve as predicted candidates are stored. The predicted candidate management unit 14 outputs a result indicating whether or not there is a predicted character string candidate to the keyboard management unit 12.

The predicted candidate management unit 14 displays, on the display unit 17, the estimated predicted candidates as a predicted candidate image 72. Accordingly, the operator can view the predicted candidates that correspond to the input character string.

The predicted candidate management unit 14 outputs the input character string, and all the estimated predicted character string candidates to the character candidate detection unit 16.

The character candidate detection unit 16 compares the input character string with the predicted character string candidates, and detects character candidates that are likely to be selected next. More specifically, the character candidate detection unit 16 obtains the readings of the input character string and the readings of the predicted character string candidates, and sequentially performs a comparison from the first character onward. The character candidate detection unit 16 detects the first one of characters that is present in the predicted character string candidates, but is not present in the input character string. The character candidate detection unit 16 detects this first character as a character candidate. The character candidate detection unit 16 detects a character candidate for each of the predicted character string candidates.

The character candidate detection unit 16 outputs the character candidates to the keyboard management unit 12. Note that, if no predicted candidate is input, the character candidate detection unit 16 cannot detect a character candidate. Accordingly, the character candidate detection unit 16 will not output a character candidate to the keyboard management unit 12. Note that if there is no character candidate, the character candidate detection unit 16 may output data that indicates the absence of a character candidate to the keyboard management unit 12.

Figure 4:
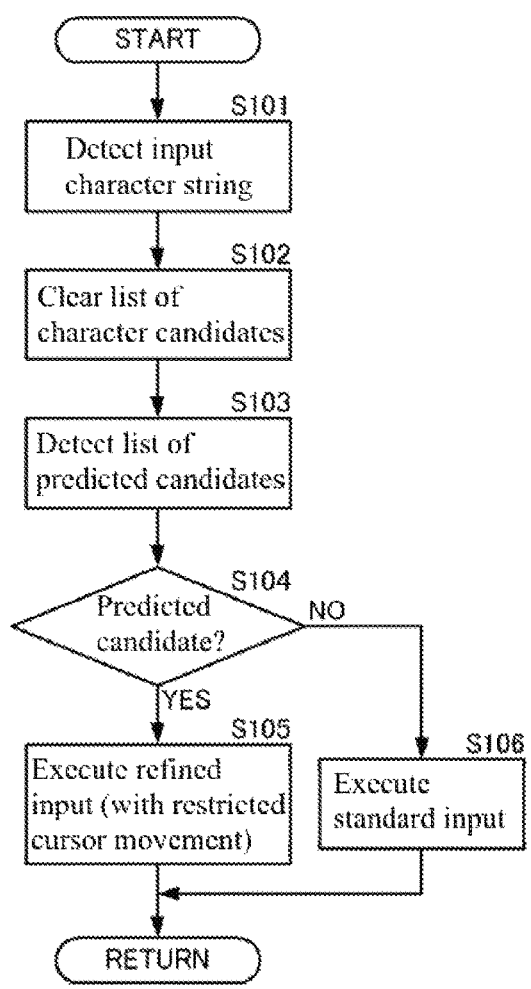
FIG. 4 is a flowchart of main processing of a character input method that is executed by the character input device.

The character input device 10 having a configuration as described above selectively executes the "refined input" and "standard input" explained below. FIG. 4 is a flowchart of main processing of a character input method that is executed by the character input device. Note that FIG. 4 shows processing that does not include a step of canceling the refined input.

The input character string management unit 13 detects an input character string (S101). The keyboard management unit 12 and the character candidate detection unit 16 clears a list of detected character candidates (S102). The predicted candidate management unit 14 compares the input character string with the character strings stored in the predicted candidate DB 15, and detects a list of predicted candidates (predicted character string candidates) (S103). The predicted candidate management unit 14 outputs, to the keyboard management unit 12, information indicating whether or not there is a predicted candidate. Note that the keyboard management unit 12 may detect whether or not there is a predicted candidate based on whether or not a character candidate is input from the character candidate detection unit 16.

If there is a predicted candidate (Yes, in step S104), the keyboard management unit 12 executes "refined input" (step S105). If there is no predicted candidate (No, in step S104), the keyboard management unit 12 executes "standard input".

Figure 5:
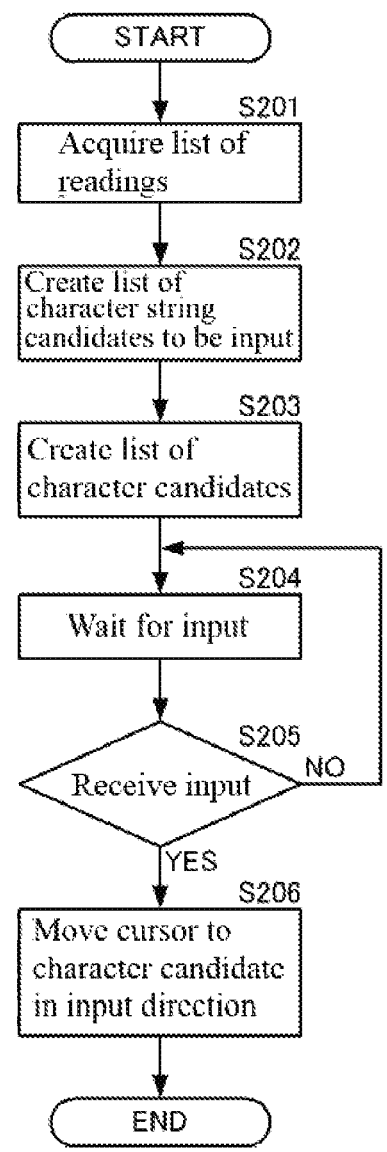
FIG. 5 is a flowchart of refined input (in which the number of input candidates is narrowed down).

FIG. 5 is a flowchart of the refined input. In the refined input, the character input device 10 executes the following processing. That is, the character candidate detection unit 16 acquires a list of the readings of the input character string and the readings of predicted character string candidates (step S201). Based on the reading of the input character string and the reading of the predicted character string candidates, the character candidate detection unit 16 detects the first one of the characters that is present in the predicted character string candidates and is not present in the input character string. The character candidate detection unit 16 creates a list of character string candidates that start with this detected character and are likely to be input (step S202). The processing is executed for each predicted character string candidate. The character candidate detection unit 16 detects the first character for each character string candidate likely to be input, and creates a list of character candidates (step S203). The character candidate detection unit 16 outputs the list of character candidates to the keyboard management unit 12.

The keyboard management unit 12 acquires the character candidates included in this list. The keyboard management unit 12 waits for an input of an input direction from the operation receiving unit 11 (step S204). If an input direction is received (Yes, in step S205), the keyboard management unit 12 moves the cursor to a character candidate that is present in the input direction (step S206). Note that the keyboard management unit 12 waits for an input of an input direction (step S204) until an input direction is received (No, in step S205).

Figure 6A:
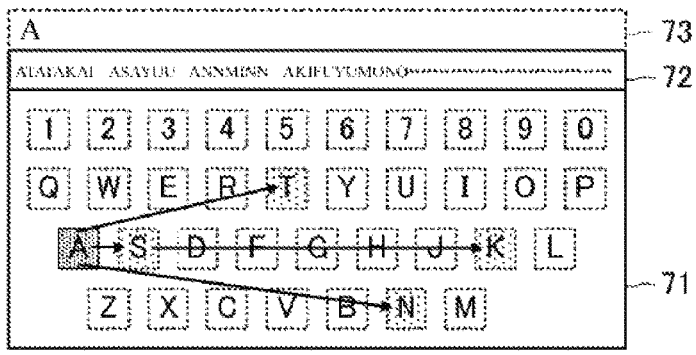
FIGS. 6A, 6B, 6C and 6D are diagrams illustrating the transition of a display screen when refined input is executed.
Figure 6B:
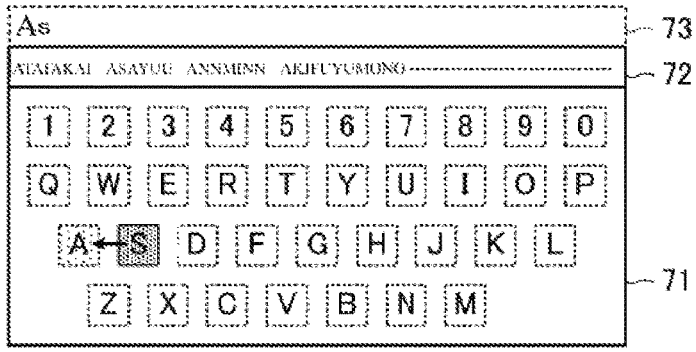
Figure 6C:
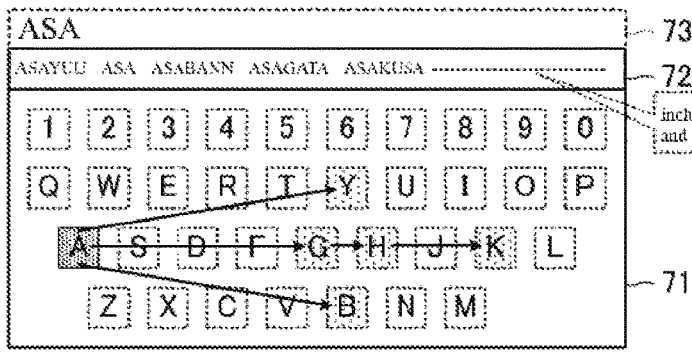
Figure 6D:
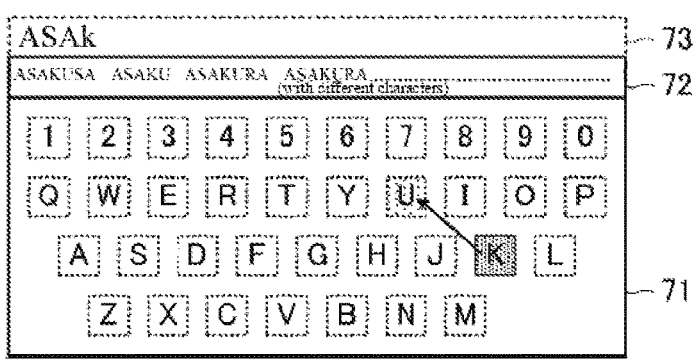
Figure 7A:
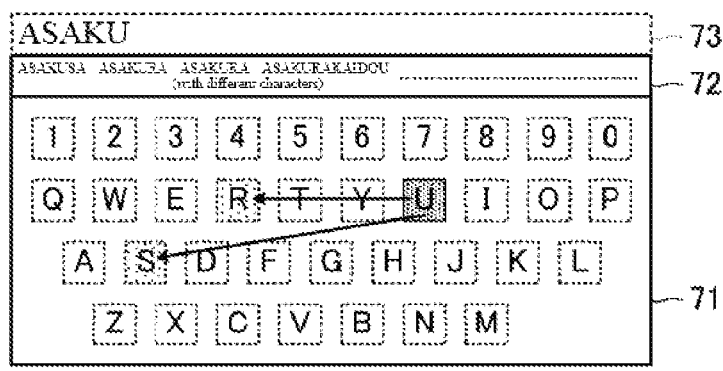
FIGS. 7A, 7B and 7C are diagrams illustrating the transition of the display screen when refined input is executed.
Figure 7B:
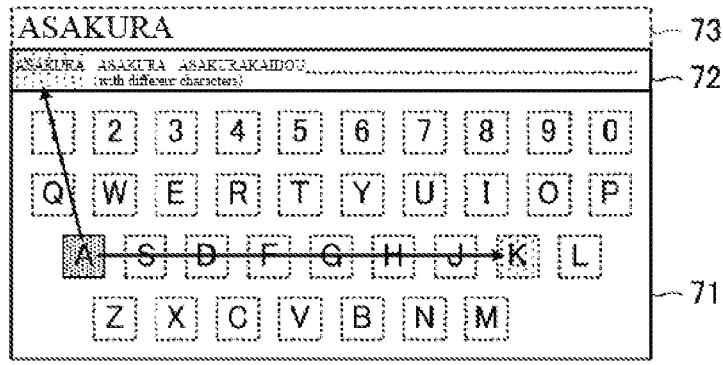
Figure 7C:
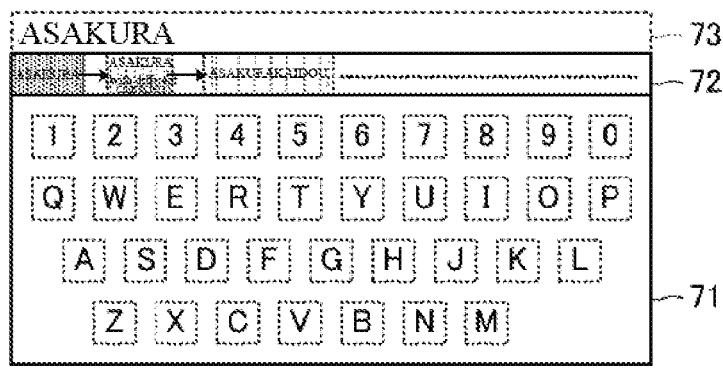

FIGS. 6 and 7 are diagrams illustrating a transition of a display screen during the execution of the refined input. The figures show that the character input advances in the order of FIGS. 6A, 6B, 6C, 6D, 7A, 7B, and 7C. Note that arrows indicated in the figures clearly show possible destinations of the movement of the cursor, and are not displayed on the display unit 17.

In FIG. 6A, the cursor is placed on the character "A". If, at this time, an "enter" operation is input (e.g. "enter" is pressed), "A" is displayed on the input character image 73. At the same time, predicted character string candidates that correspond to the character "A" are estimated. Here, "ATATAKAI", "ASAYUU", "ANNMINN", "AKIFUYU-MONO", and the like are estimated as the predicted character string candidates, and are displayed on the predicted candidate image 72.

The readings of these predicted character string candidates are compared with the reading of the input character string (or the input character), and character candidates are detected. Here, the character candidates "T", "S", "N", and "K" are detected.

If, at this time, an input direction that is input with the D-pad is received, the cursor is moved to any of the characters "T", "S", "N", and "K", depending on the input direction. In other words, the cursor is not moved to any characters other than the characters "T", "S", "N", and "K".

Specifically, for example, if the right input direction is received once, the cursor is moved to the character "S". If the right input direction is received twice, the cursor is moved to the character "K".

The cursor is moved to the character "T" if the upper input direction is received, and the cursor is moved to the character "N" if the lower input direction is received. This is realized by executing the following processing.

Figure 8:
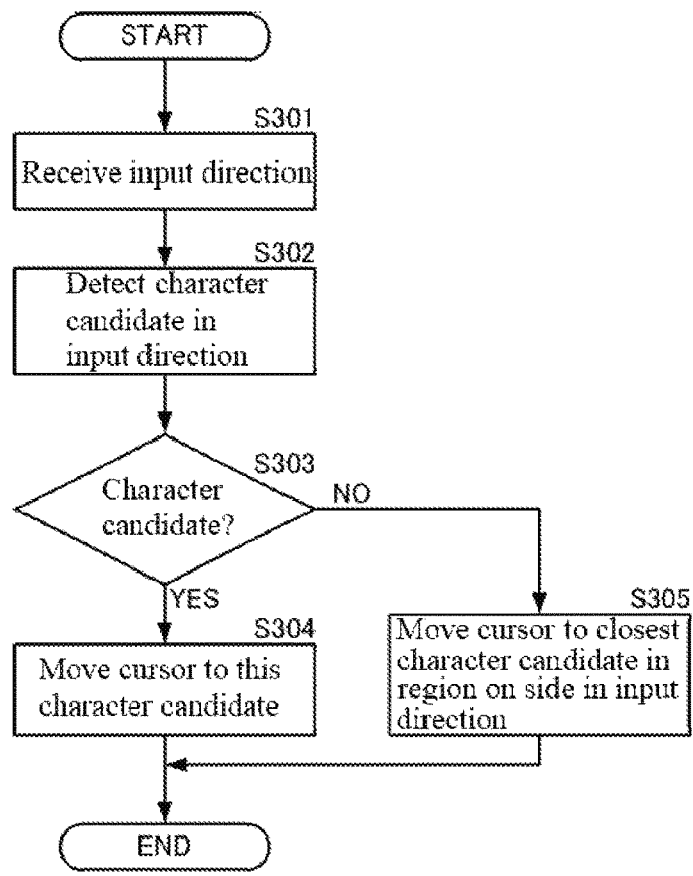
FIG. 8 is a flowchart illustrating an example of a specific concept for detecting a character candidate.

FIG. 8 is a flowchart illustrating an example of a specific concept of detecting a character candidate. As shown in FIG. 8, when the keyboard management unit 12 has received an input direction (step S301), the keyboard management unit 12 detects whether or not there is a character candidate in this input direction (step S302). In the case of FIG. 6A for example, if the upper input direction is received for the character "A", then in the standard input that will be described later, the cursor is moved to the character "Q" and then the character "1" in that order. Accordingly, it is detected whether or not these characters "Q" and "1" are character candidates.

If there is a character candidate in the input direction (Yes, in step S303), the keyboard management unit 12 moves the cursor to this character candidate. On the other hand, if there is no character candidate in the input direction (No, in step S303), the keyboard management unit 12 moves the cursor to the character candidate that is located in a region on the side in the input direction with respect to the character on which the cursor is placed, and that is the closest to the character on which the cursor is placed (step S305). For example, in the case of FIG. 6A, if the upper input direction is received in the state in which the cursor is placed on the character "A", then the cursor is moved to the character "T" that is arranged in one of the rows above the row to which the character "A" belongs, and that is the closest to the character "A". The cursor may also be moved to the character "N" by similar processing.

In this way, by using the configuration of the character input device 10, and processing thereof, it is possible to input a desired character without just performing the operation input of moving the cursor. For example, if the character "K" is to be input after the character "A" has been input, in a conventional method, the cursor needs to be moved to the characters "S", "D", "F", "G", "H", "J", and "K" in that order. However, in the configuration of the character input device 10 and the processing thereof, the cursor only needs to be moved to the character "S" and "K" in that order. That is, while the conventional method requires seven input operations, the configuration of the character input device 10 requires only two input operations.

Accordingly, in the character input using a D-pad, it is possible to improve the operability for inputting a desired character string.

Note that the processing of FIG. 6B onward is performed similarly, and will schematically be described below.

In FIG. 6B, the cursor is placed on the character "S". At this time, "As" is displayed on the input character image 73. Since the predicted candidates include "ASAYUU", the character "A" is regarded as a character candidate.

In FIG. 6C, the cursor is placed on the character "A". In this case, "ASA" is displayed in the input character image 73. The predicted candidates are updated, and "ASAYUU", "ASA", "ASABANN", "ASAGATA", "ASAKUSA" and the like are displayed in the predicted candidate image 72. Note that the predicted candidates include "ASAHINA" although it is not shown. In this case, the character candidates "G", "H", "K", "Y", and "B" are detected. In this way, character candidates of predicted character string candidates that are not displayed on the predicted candidate image 72 are also detected. If, at this time, an input direction that was input using the D-pad is received, the cursor is moved to one of the characters "G", "H", "K", "Y", and "B" depending on the input direction.

In FIG. 6D, the cursor is placed on the character "K". At this time, "ASAk" is displayed on the input character image 73. Since the predicted candidates include "ASAKUSA", the character "U" is regarded as a character candidate.

In FIG. 7A, the cursor is placed on the character "U". In this case, "ASAKU" is displayed on the input character image 73. The predicted candidates are updated, and "ASAKUSA", "ASAKURA", "ASAKURA (written with different Chinese characters)", "ASAKURAKAIDOU" and the like are displayed on the predicted candidate image 72. In this case, the character candidates "R" and "S" are detected. If, at this time, an input direction that was input using the D-pad is received, the cursor is moved to the character "R" or "S" depending on the input direction.

In FIG. 7B, the character input has further advanced, and the cursor is placed on the character "A" after the character "R" has been input. In this case, "ASAKURA" is displayed on the input character image 73. The predicted candidates are updated, and "ASAKURA", "ASAKURA (written with different Chinese characters)", "ASAKURAKAIDOU", and the like are displayed on the predicted candidate image 72. In this case, the character candidate "K" is detected. Here, the character candidate is not present in the region above the character on which the cursor is placed (region on the predicted candidate image 72 side). If, in this case, the keyboard management unit 12 detects the upper input direction, the keyboard management unit 12 moves the cursor to the predicted character string candidate in the predicted candidate image 72. Note that even in the above-described cases of FIGS. 6A, 6B, 6C, 6D, and 7A, if there is no character candidate in the region above the character on which the cursor is placed, the keyboard management unit 12 can move the cursor to a predicted character string candidate in the predicted candidate image 72 in a similar manner by receiving the upper input direction a predetermined number of times.

In FIG. 7C, the cursor is placed in the predicted candidate image 72. In this case, it is possible to place the cursor on a desired character string of the plurality of predicted character string candidates, by receiving the right input direction or the left input direction. The keyboard management unit 12 completes the character input when having received an input of the "enter" operation when the cursor was placed on the desired character string.

Figure 9:
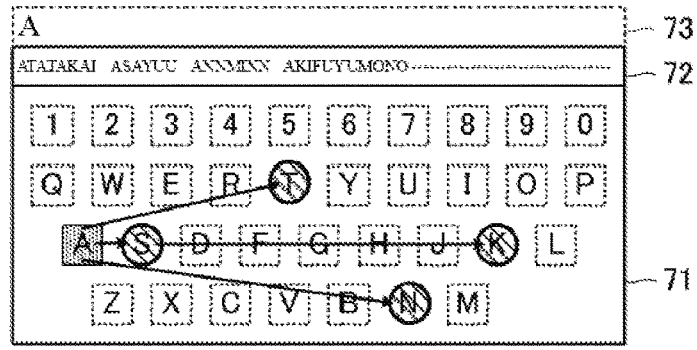
FIG. 9 is a diagram illustrating an example of a display image with highlighting.

Note that in a case where such refined input is executed, character candidates may be highlighted as shown in FIG. 9. FIG. 9 is a diagram illustrating an example of a display image with highlighting. FIG. 9 shows the state of the same character candidates as those shown in FIG. 6A. As shown in FIG. 9, the character candidates are displayed in a different mode from those of the character on which the cursor is placed and other characters. By performing such highlighting, the operator can easily view the destinations of the movement of the cursor during the refined input.

Figure 10:
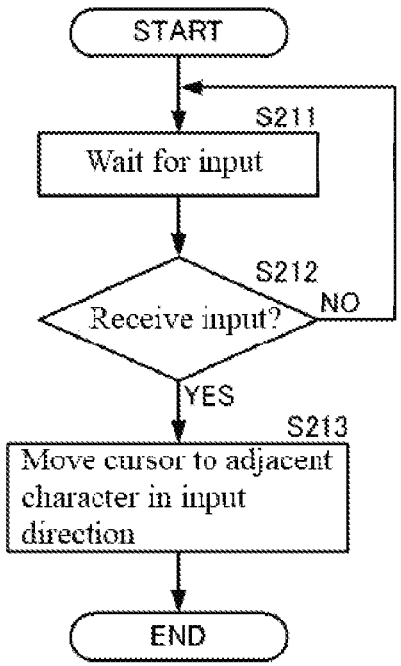
FIG. 10 is a flowchart of standard input.
Figure 11:
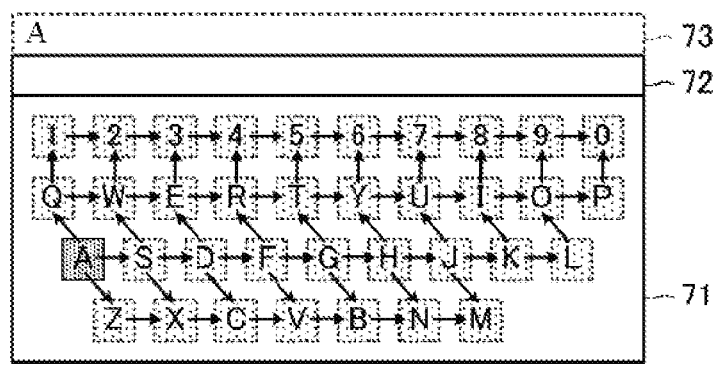
FIG. 11 is a diagram illustrating a concept of possible movement of a cursor in standard input.

FIG. 10 is a flowchart of standard input. In the standard input, the character input device 10 executes the following processing. The processing of the standard input that is executed by the character input device 10 is the same as that of conventional character input. FIG. 11 is a diagram illustrating the concept of trajectories in which the cursor can be moved in the standard input. When performing standard input, the character input device 10 can move the cursor to characters in the frames indicated by dotted lines of FIG. 11, that is, all the characters.

The keyboard management unit 12 waits for an input of an input direction from the operation receiving unit 11 (step S211). If an input direction is received (Yes, in step S212), the keyboard management unit 12 moves the cursor to the character that is adjacent, in the input direction, to the character on which the cursor is placed (step S213). Note that the keyboard management unit 12 waits for an input (step S211) until an input direction is input (No, in step S212).

By using such standard input processing, it is possible to move the cursor to a desired character when there is no predicted candidate as described above, for example, when the first character is input. Furthermore, this standard input is applicable to a case when cancellation of the refined input is executed, that is, when, for example, there is no desired character string in the predicted character string candidates, as will be described below.

Figure 12:
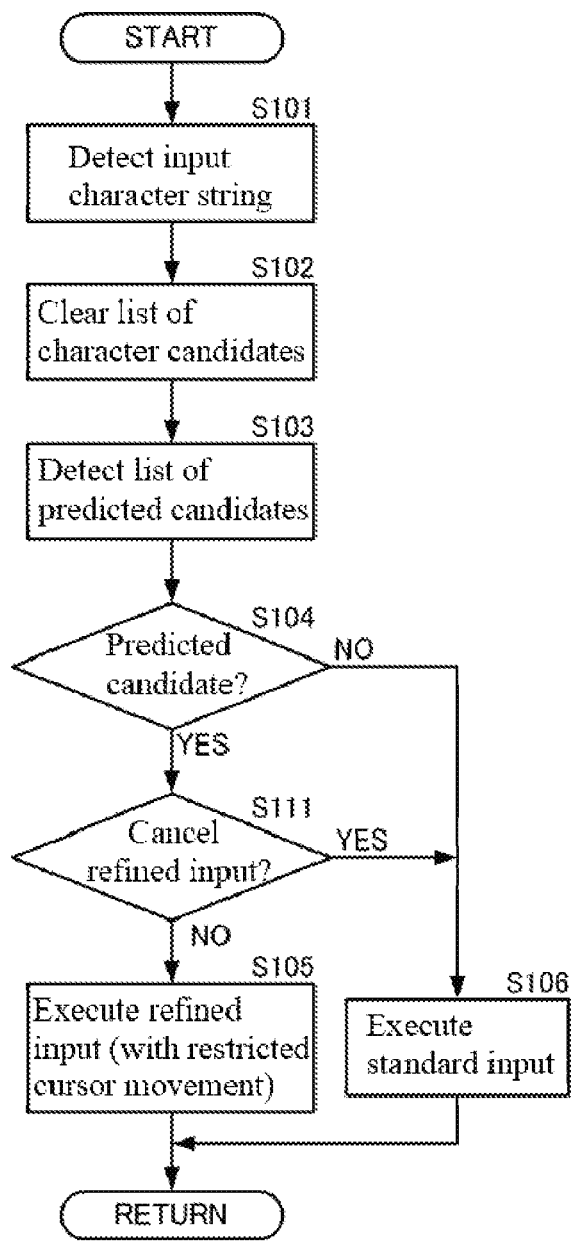
FIG. 12 is a flowchart of main processing of a character input method that includes a step of canceling the refined input.

FIG. 12 is a flowchart of the main processing of the character input method including a step of canceling the refined input. The flow shown in FIG. 12 differs from the flow shown in FIG. 4 in that the step of canceling the refined input is added. Other processes of the flow shown in FIG. 12 are the same as those of the flow shown in FIG. 4, and thus descriptions of the same processes are omitted.

The operation receiving unit 11 receives an input of an operation for canceling the refined input. As a specific example, if any of the upward operation button 22U, the downward operation button 22D, the rightward operation button 22R, the leftward operation button 22L, and the enter button 22C of the D-pad 22 is pressed for a long period of time, the operation receiving unit 11 detects this operation as an input of the operation for canceling the refined input, and outputs this operation to the keyboard management unit 12.

If the keyboard management unit 12 receives an input of an operation for canceling the refined input from the operation receiving unit 11 in a state in which it is determined that there is a predicted candidate (Yes, in step S111), the keyboard management unit 12 executes the above-described standard input (step S106). If the operation for canceling the refined input is not received (No, in step S111), the keyboard management unit 12 executes refined input (step S105).

By making it possible to cancel the refined input in this way, it is possible to reliably and easily move the cursor to input a desired character string, even if there is no desired character string among the predicted character string candidates. Accordingly, it is possible to realize character input with better operability.

Note that, although not shown in the flowchart, it is also possible to restart the cancelled refined input. In this case, it is only necessary to execute processing for receiving an input of an operation for restarting the refined input in the state in which the refined input is cancelled. For example, it is only necessary to restart the refined input, by performing the same operation input as the input of the operation for canceling the refined input in the state in which the refined input is canceled. Accordingly, it is possible to realize character input with better operability.

Figure 13:
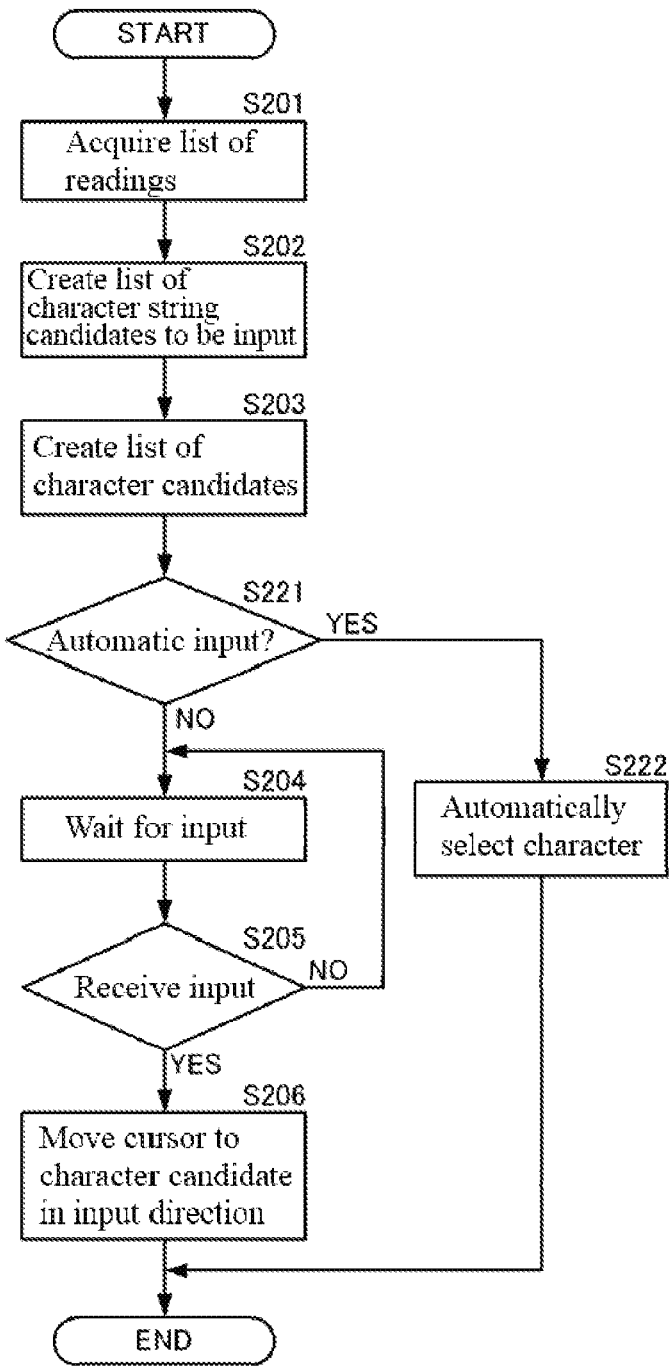
FIG. 13 is a flowchart of main processing of a character input method that includes a step of automatically inputting a character (automatically moving a cursor).

Furthermore, the character input device 10 can also execute automatic character input (processing in which the cursor is moved automatically). FIG. 13 is a flowchart of the main processing of a character input method including a step of automatically inputting a character (automatically moving the cursor). The flow shown in FIG. 13 differs from the flow shown in FIG. 5 in that the step of automatically inputting a character (automatically moving the cursor) is added. Other processes of the flow shown in FIG. 13 are the same as those of the flow shown in FIG. 5, and thus descriptions of the same processes are omitted.

If the keyboard management unit 12 receives an input of an operation for performing the automatic input in the state in which a list of character candidates was created (Yes, in step S221), the keyboard management unit 12 executes the automatic character input (step S203). The input of the operation for performing the automatic input is realized by just assigning a predetermined operation input to the operation receiving unit 11, similar to the above-described cancellation of refined input. If the operation for performing the automatic input is not input (No, in step S221), the keyboard management unit 12 executes the above-described refined input.

The automatic character input is realized by using the following method. The predicted candidate management unit 14 sets an order of priority when creating a list of predicted character string candidates. The order of priority can be determined with reference to the previous input history. For example, a higher priority is set for a character string that was input more frequently than other character strings. Furthermore, it is also possible to set a higher priority for a character string that was frequently input in recent days with reference to the recent input history. Note that a priority does not need to be set if there is only one predicted character string candidate.

If there are a plurality of predicted character string candidates, the respective predicted character string candidates are output with priorities associated therewith. The character candidate detection unit 16 associates the respective character candidates with priorities, and outputs them to the keyboard management unit 12.

Figure 14A:
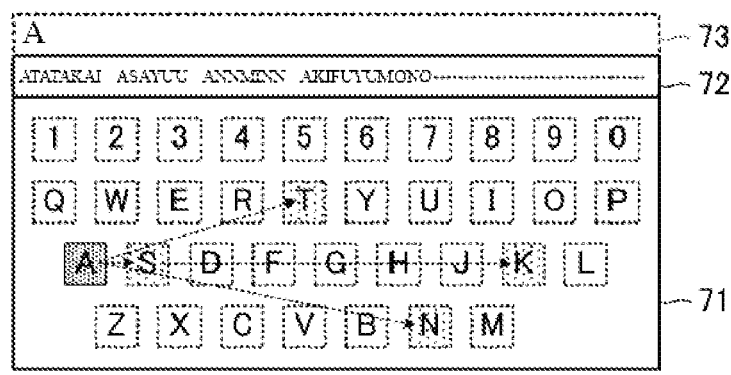
FIGS. 14A and 14B are diagrams illustrating states in which the cursor moves during automatic input.
Figure 14B:
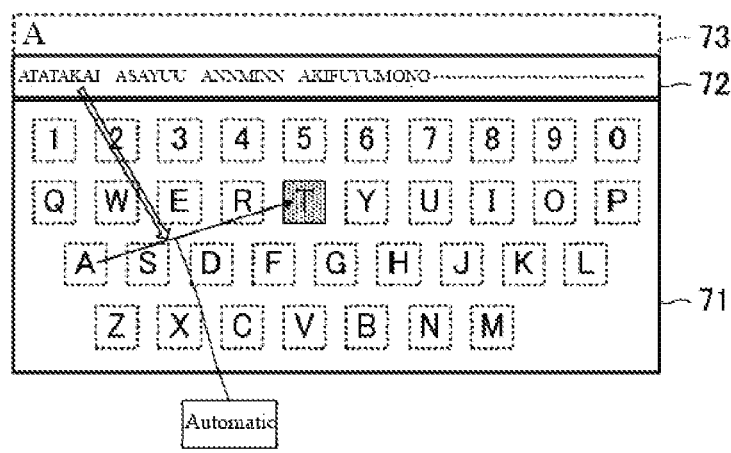

The keyboard management unit 12 moves the cursor to the character candidate obtained from the predicted character string candidate with the highest priority. FIGS. 14A and 14B are diagrams illustrating the state in which the cursor is moved during the automatic input: specifically, FIG. 14A showing the state prior to the movement, and FIG. 14B showing the state after the movement. As shown in FIGS. 14A and 14B, it is assumed that in the state in which the character "A" was input, "ATATAKAI" is the character string with the highest priority of the predicted candidates. In this case, the next character is "T", and the cursor will automatically move to the character "T", as shown in FIG. 14B.

By using such automatic character input, it is possible to improve the operability of character input based on a predicted candidate.

Note that, although not shown, the automatic input can also be cancelled, similarly to the above-described cancellation of the refined input. Accordingly, even if a non-intended character is input during the automatic input, it is possible to cancel the automatic input to reliably input a desired character string. In this case, it is also possible to return to the state prior to the movement of the cursor that was made by this automatic input.

Figure 15:
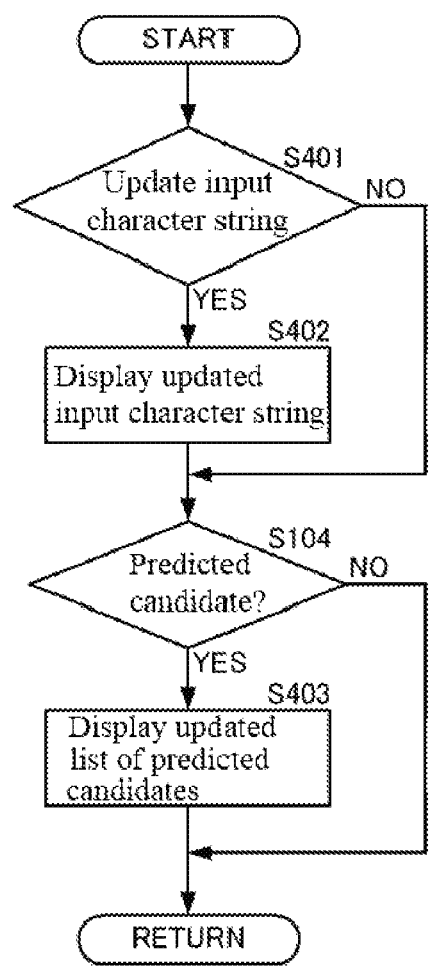
FIG. 15 is a flowchart of main processing of display control that is executed by the character input device.

The description above has explained the processes for moving the cursor and inputting a character that are performed by the character input device 10. The character input device 10 executes the following display control in parallel to these processes. FIG. 15 is a flowchart of the main processing of the display control that is executed by the character input device.

If the input character string needs to be updated (Yes, in step S401), the input character string management unit 13 updates the input character string (step S402), and displays the updated input character image 73. The update of the input character string is executed when a new character is input from the keyboard management unit 12. If the input character string does not need to be updated (No, in step S402), the input character string management unit 13 does not update the input character image 73.

If there is a new predicted candidate as a result of the update of the input character string (Yes, in step S105), the predicted candidate management unit 14 updates the list of predicted candidates, and displays the updated list as the predicted candidate image 72 (step S403).

Figure 16A:
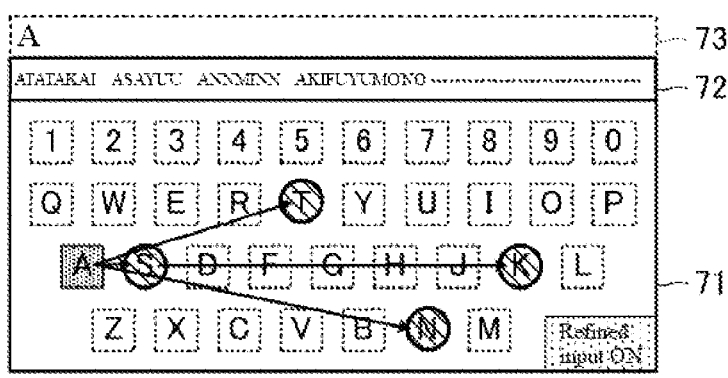
FIGS. 16A and 16B are diagrams illustrating display states in which "refined input ON" and "refined input OFF" are displayed.
Figure 16B:
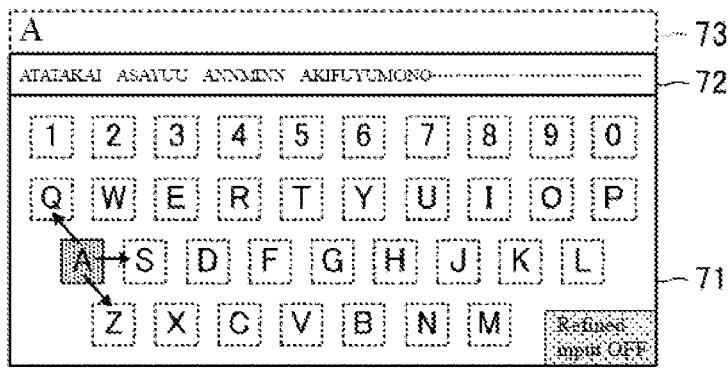

Furthermore, the character input device 10 may have the following function. FIG. 16 are diagrams illustrating display states in which "refined input ON" and "refined input OFF" are respectively displayed. FIG. 16A shows the state in which the refined input is enabled, and FIG. 16B shows the state in which the refined input is not enabled.

If the refined input is enabled, the keyboard management unit 12 of the character input device 10 displays "refined input ON" on the keyboard image 71 as shown in FIG. 16A. If refined input is not enabled, the keyboard management unit 12 displays "refined input OFF" on the keyboard image 71 as shown in FIG. 16B.

By performing this display, the operator can view the display screen to easily recognize whether or not refined input is enabled.

Note that in the description above has explained the mode in which the processes of the refined input of characters are executed by the plurality of functional units. However, the processes of the keyboard management unit 12, the input character string management unit 13, the predicted candidate management unit 14, and the character candidate detection unit 16 may be executed by a computer. In this case, the above-described processes that are executed on the keyboard management unit 12, the input character string management unit 13, the predicted candidate management unit 14, and the character candidate detection unit 16 are programmed, and stored as programs in a storage medium or the like. The programs can be read and executed by the computer.

The invention claimed is:

1. A character input device for selecting and inputting a desired character from a plurality of displayed characters using a directional pad (D-pad) to place a cursor on the desired character to select and input the desired character, the character input device comprising a processor configured with a program to perform operations comprising:
   operation as an input character string management unit configured to manage an input character string comprising one or more characters that are selected and input using the D-pad;
   operation as a predicted candidate management unit configured to estimate predicted character string candidates based on a current state of the input character string, and manage the predicted character string candidates;
   operation as a character candidate detection unit configured to compare the current state of the input character string with the predicted character string candidates, and detect one or more character candidates that are to be selected next;
   operation as an operation receiving unit configured to receive an input direction that is input with the D-pad with respect to a character on which the cursor is currently placed, the input direction for moving the cursor to a next desired character to be selected; and
   operation as a keyboard management unit configured to execute refined input, in which the cursor is moved only to a character candidate detected by the character candidate detection unit, that is present in the input direction with respect to the character on which the cursor is currently placed and movement of the cursor is restricted to only the detected one or more character candidates.

2. The character input device according to claim 1, wherein the processor is configured with the program such that:
   the operation receiving unit is capable of receiving a cancellation of the refined input, and
   if the operation receiving unit receives the cancellation of the refined input, the keyboard management unit executes standard input, in which the cursor is moved to a character that is adjacent, in the input direction, to the character on which the cursor is currently placed.

3. The character input device according to claim 1, wherein the processor is configured with the program such that, if the keyboard management unit detects that there is no character candidate in the input direction, the keyboard management unit moves the cursor from the character on which the cursor is currently placed to a character candidate that is present in a region in the input direction and to a side of the character on which the cursor is currently placed, and is closest to the character on which the cursor is currently placed.

4. The character input device according to claim 1, wherein the processor is configured with the program such that, if there is no predicted character string candidate, the keyboard management unit executes standard input, in which the cursor is moved to a character that is adjacent, in the input direction, to the character on which the cursor is currently placed.

5. The character input device according to claim 1, wherein the processor is configured with the program such that the keyboard management unit highlights the character candidate.

6. The character input device according to claim 1, wherein the processor is configured with the program such that:
   if there are a plurality of predicted character string candidates, the predicted candidate management unit sets an order of priority for the plurality of predicted character string candidates, and
   in execution of the refined input, if there is only one predicted character string candidate, the keyboard management unit automatically moves the cursor to the character candidate obtained from the predicted character string candidate, and if there are a plurality of predicted character string candidates, the keyboard management unit automatically moves the cursor to the character candidate obtained from the predicted character string candidate with a highest priority.

7. A character input method for selecting and inputting a desired character from a plurality of displayed characters using a directional pad (D-pad) to place a cursor on the desired character, the method comprising:
   managing an input character string comprising one or more characters that are selected and input using the D-pad;
   estimating predicted character string candidates based on a current state of the input character string, and managing the predicted character string candidates;
   comparing the current state of the input character string with the predicted character string candidates;
   detecting one or more character candidates that are to be selected next;
   receiving an input direction that is input by using the D-pad with respect to a character on which the cursor is currently placed, the input direction for moving the cursor to a next desired character to be selected; and executing refined input, in which the cursor is moved only to a detected character candidate present in the input direction with respect to the character on which the cursor is currently placed, and movement of the cursor is restricted to only the detected one or more character candidates.

8. A non-transitory computer-readable medium storing a character input program for causing a computer to execute character input processing in which a character on which a cursor is placed using a directional pad (D-pad) is selected from a plurality of displayed characters, the character input program causing the computer to perform operations comprising:

managing an input character string comprising one or more characters that are selected and input using the D-pad;

estimating predicted character string candidates based on a current state of the input character string, and managing the predicted character string candidates;

comparing the current state of the input character string with the predicted character string candidates;

detecting one or more character candidates that are to be selected next;

receiving an input direction that is input by using the D-pad with respect to a character on which the cursor is currently placed, the input direction for moving the cursor to a next desired character to be selected; and executing refined input, in which the cursor is moved only to a detected character candidate present in the input direction with respect to the character on which the cursor is currently placed, and movement of the cursor is restricted to only the detected one or more character candidates.

9. The method according to claim 7, further comprising:
receiving a cancellation of the refined input; and
executing standard input in which the cursor is moved to a character that is adjacent, in the input direction, to the character on which the cursor is currently placed.

10. The method according to claim 7, further comprising:
detecting that there is no character candidate in the input direction; and
moving the cursor from the character on which the cursor is currently placed to a character candidate that is present in a region in the input direction and to a side of the character on which the cursor is currently placed and is closest to the character on which the cursor is currently placed.

11. The method according to claim 7, further comprising:
detecting that there is no predicted character string candidate; and executing standard input in which the cursor is moved to a character that is adjacent, in the input direction, to the character on which the cursor is currently placed.

12. The method according to claim 7, further comprising highlighting the character candidate.

13. The method according to claim 7, further comprising:
setting an order of priority for a plurality of predicted character string candidates; and
automatically moving the cursor to the character candidate obtained from the predicted character string candidate with a highest priority.

14. The non-transitory computer-readable medium according to claim 8, wherein the character input program causes the computer to perform operations further comprising:
receiving a cancellation of the refined input; and
executing standard input in which the cursor is moved to a character that is adjacent, in the input direction, to the character on which the cursor is currently placed.

15. The non-transitory computer-readable medium according to claim 8, wherein the character input program causes the computer to perform operations further comprising:
detecting that there is no character candidate in the input direction; and
moving the cursor from the character on which the cursor is currently placed to a character candidate that is present in a region in the input direction and to a side of the character on which the cursor is currently placed and is closest to the character on which the cursor is currently placed.

16. The non-transitory computer-readable medium according to claim 8, wherein the character input program causes the computer to perform operations further comprising:
detecting that there is no predicted character string candidate; and
executing standard input in which the cursor is moved to a character that is adjacent, in the input direction, to the character on which the cursor is currently placed.

17. The non-transitory computer-readable medium according to claim 8, wherein the character input program causes the computer to perform operations further comprising highlighting the character candidate.

18. The non-transitory computer-readable medium according to claim 8, wherein the character input program causes the computer to perform operations further comprising:
setting an order of priority for a plurality of predicted character string candidates; and
automatically moving the cursor to the character candidate obtained from the predicted character string candidate with a highest priority.

* * * * *